(12) United States Patent
Kanesaka (10) Patent No.: US 7,567,759 B2
(45) Date of Patent: Jul. 28, 2009

(54) OPTICAL APPARATUS

(75) Inventor: Hiroki Kanesaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 488 days.

(21) Appl. No.: 11/580,911

(22) Filed: Oct. 16, 2006

(65) Prior Publication Data

US 2007/0223919 A1    Sep. 27, 2007

(30) Foreign Application Priority Data

Mar. 27, 2006    (JP) .............................. 2006-085057

(51) Int. Cl.
- *H04B 10/00* (2006.01)
- *H03K 5/14* (2006.01)
- *H04B 1/38* (2006.01)
- *H04B 3/20* (2006.01)

(52) U.S. Cl. ...................... 398/136; 398/135; 398/137; 398/138; 398/128; 398/130; 398/158; 398/159; 398/161

(58) Field of Classification Search ......... 398/135–138, 398/128, 130, 158, 159, 161
See application file for complete search history.

(56) References Cited

U.S. PATENT DOCUMENTS

| | | | | |
|---|---|---|---|---|
| 3,571,597 | A * | 3/1971 | Wood et al. | 398/41 |
| 4,287,606 | A * | 9/1981 | Frosch et al. | 398/158 |
| 4,691,385 | A * | 9/1987 | Tupman | 398/109 |
| 5,317,441 | A * | 5/1994 | Sidman | 398/41 |
| 5,781,318 | A * | 7/1998 | Tremblay | 398/22 |
| 5,926,302 | A * | 7/1999 | Hirohashi et al. | 398/119 |
| 6,504,635 | B1 * | 1/2003 | Nakashima | 398/25 |
| 6,535,308 | B1 * | 3/2003 | BuAbbud et al. | 398/41 |
| 6,619,867 | B1 * | 9/2003 | Asahi | 398/154 |
| 6,708,003 | B1 * | 3/2004 | Wickham et al. | 398/102 |
| 7,082,157 | B2 * | 7/2006 | Lin et al. | 375/219 |
| 7,174,098 | B2 * | 2/2007 | Yokoyama | 398/33 |
| 7,324,457 | B2 * | 1/2008 | Lee et al. | 370/249 |
| 7,391,975 | B2 * | 6/2008 | Oettinger et al. | 398/129 |
| 7,483,638 | B2 * | 1/2009 | Hayashi | 398/135 |
| 2003/0039002 | A1 * | 2/2003 | Toriumi et al. | 359/113 |
| 2007/0223919 | A1 * | 9/2007 | Kanesaka | 398/27 |
| 2008/0199186 | A1 * | 8/2008 | Domagala | 398/155 |
| 2008/0199192 | A1 * | 8/2008 | Domagala | 398/208 |
| 2008/0212976 | A1 * | 9/2008 | Asano | 398/161 |
| 2009/0088201 | A1 * | 4/2009 | Kousai | 455/552.1 |

FOREIGN PATENT DOCUMENTS

| | | |
|---|---|---|
| JP | 2002-262356 | 9/2002 |
| JP | 2003-023414 | 1/2003 |

* cited by examiner

*Primary Examiner*—Ken N Vanderpuye
*Assistant Examiner*—Danny W Leung
(74) *Attorney, Agent, or Firm*—Staas & Halsey LLP (57) ABSTRACT

An optical apparatus comprises a phase comparator detecting a phase shift between a changing point of data transmitted through an electro/opto converter and a changing point of data received through an opto/electro converter, a delay controller and a variable delay circuit controlling a delay of the transmitted data so that the phase shift detected becomes equal to a value which minimizes a receiver sensitivity degradation due to crosstalks between a transmitter portion and a receiver portion.

6 Claims, 11 Drawing Sheets

| A | B | Y |
|---|---|---|
| L | L | L |
| L | H | H |
| H | L | H |
| H | H | L |

FIG.2C
PHASE SHIFT= 0°

FIG.2D
PHASE SHIFT= 90°

FIG.2E
PHASE SHIFT= 180°

FIG.2F

PHASE SHIFT BETWEEN TRANSMITTED DATA "A" AND RECEIVED DATA "B"

FIG.3A

PHASE SHIFT BETWEEN TRANSMITTED DATA AND RECEIVED DATA

FIG.3B

DELAY CONTROLLER OUTPUT $V_c = V_1 - V_0$ (VOLTAGE)

FIG.10B   PHASE SHIFT BETWEEN TRANSMITTER AND RECEIVER:
MINIMUM RECEIVER SENSITIVITY DEGRADATION

FIG.10C   PHASE SHIFT BETWEEN TRANSMITTER AND RECEIVER:
MAXIMUM RECEIVER SENSITIVITY DEGRADATION

FIG.11

OPTICAL APPARATUS

BACKGROUND OF THE INVENTION

1. Field of the Invention

The present invention relates to an optical apparatus, and in particular to an optical apparatus composing an optical transmitting/receiving module where a transmitter portion and a receiver portion are integrated into an optical transmission device.

2. Description of the Related Art

Recently, a large-capacity and compact integrated optical transmitting/receiving module has been more and more standardized, and a market of MSA (Multi Source Agreement) optical module such as 300 pin/XENPAK/X2/XFP in 10 Gbps has been expanded.

Figure 9:
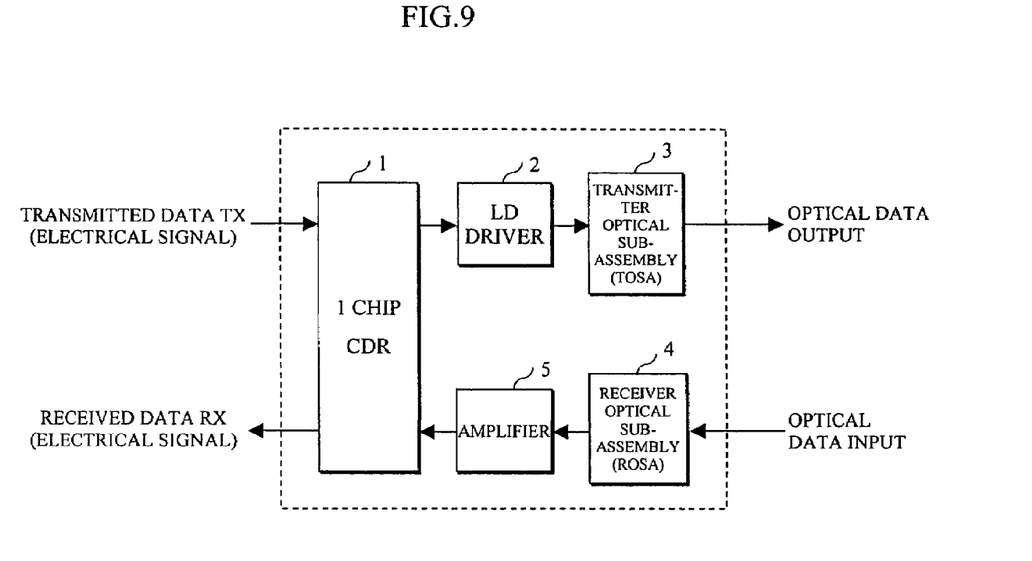
FIG. 9 is a block diagram showing an arrangement of an optical apparatus as an optical module which has been generally known.

FIG. 9 shows an arrangement of an optical apparatus generally known as a 10G MSA XFP optical module. This optical apparatus normally includes a single chip CDR (Clock Data Recovery) 1 commonly for a transmitter portion and a receiver portion. The CDR 1 includes therein a CDR portion (not shown) for each of the transmitter portion and the receiver portion. The CDR of the transmitter portion performs a retiming and a regenerating from an electrical signal of transmitted data TX. In the transmitter portion, an LD driver 2 and a transmitter optical sub-assembly (TOSA) 3 are connected in series to the output of the CDR 1. The output of the CDR 1 drives the LD driver 2, and then undergoes an electro/opto conversion in the transmitter optical sub-assembly 3 to be outputted as optical data.

In the receiver portion, a receiver optical sub-assembly (ROSA) 4 and an amplifier 5 are connected in series to the CDR 1. An optical data input to the receiver optical sub-assembly 4 undergoes an opto/electro conversion, and the converted data is further amplified and reshaped by the amplifier 5 to be provided to the single chip CDR 1. In the CDR 1, the retiming and the regenerating are performed from the electrical signal received to be outputted as an electrical signal of received data RX.

On the other hand, in a digital subscriber line (xDSL) transmission, there is a digital subscriber line transmission method, a transmission device, and a transmission system in which, upon training performed prior to data communication, timing information specifying a period when influence of crosstalks is received from an adjoining line is included in a training symbol string, the training symbol string is notified from a station side device to a subscriber device, and the timing information is inserted into the training symbol string by changing a phase of a training symbol (see e.g. patent document 1).

Also, there is a wireless communication terminal, performing a wireless communication in synchronization with a base station, which includes reception strength measurement means measuring a strength of a signal received from the base station, and a transmission timing determination means hastening a transmission timing of a signal transmitted to the base station when the reception signal strength is determined to be weak, based on the result of a comparison between the reception signal strength measured by the reception strength measurement means and a preset value (see e.g. patent document 2).

[Patent document 1] Japanese Patent Application Laid-open No. 2003-23414

[Patent document 2] Japanese Patent Application Laid-open No. 2002-262356

In case of the optical apparatus shown in FIG. 9, for need of a high-density mounting, the single chip CDR 1 can be used. For mounting the single chip CDR 1 on a compact package, the transmitter portion and the receiver portion are arranged close to each other on the same printed board.

Figure 10A:
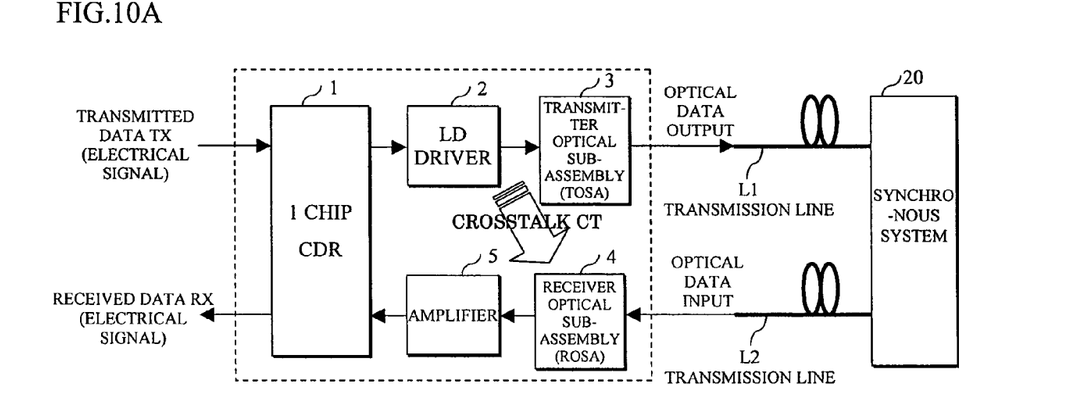
FIGS. 10A-10C are diagrams for illustrating crosstalks between a transmitter portion and a receiver portion in a prior art optical apparatus.

At this time, as shown in FIG. 10A, a received signal of a minute amplitude in the order of several tens of millivolt (mV) outputted from the receiver optical sub-assembly 4 is influenced by crosstalks CT from the LD driver 2 which drives the transmitted data TX with a larger amplitude in the order of several volt (V), so that the receiver sensitivity degrades. The crosstalks increase as the transmitter portion and the receiver portion come close to each other. Therefore, the crosstalks become remarkable as the bit rate is enhanced and the optical apparatus becomes compact, so that how the crosstalks are reduced is a problem in a circuit design and a mounting design.

Such crosstalks can be conceived as follows.

In a system where the transmitted data synchronizes with the received data, a phase relationship between the transmitted data and the received data within the optical apparatus is normally fixed. On the other hand, when long-distance optical fiber transmission lines L1 and L2 are connected to a synchronous system 20 as shown in FIG. 10A, and when a fluctuation or the like of a propagation time exists due to an environmental variation, the phase relationship varies at a slow speed in the order of several seconds. Together with this variation, a phenomenon occurs that a receiver sensitivity degradation varies due to the phase relationship of the transmitted data and the received data, even if the above-mentioned crosstalks are constant.

Figure 10B:
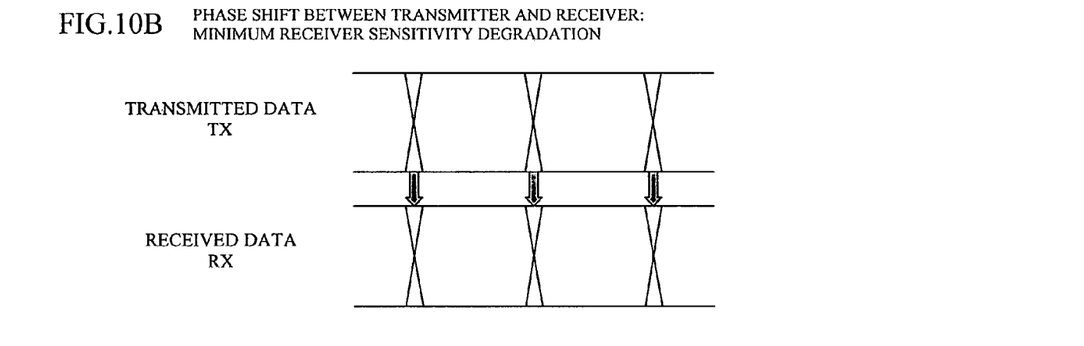
Figure 10C:
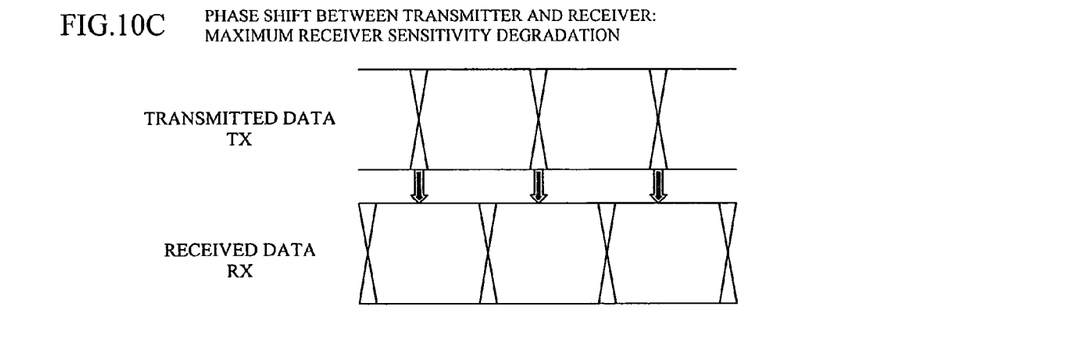

For example, when the changing points of the transmitted data TX and the received data RX within the optical apparatus are coincident with each other as shown in FIG. 10B, the receiver sensitivity degradation seldom occurs. However, when the changing points of the transmitted data TX are positioned around the center of an eye (opening) of the received data RX as shown in FIG. 10C, the receiver sensitivity degradation is maximized.

When such an optical apparatus is used for a non-synchronous system, the phase relationship of the transmitted data and the received data changes at an extremely high speed, so that the receiver sensitivity degradation is averaged on a time basis, and no variation is observed.

Figure 11:
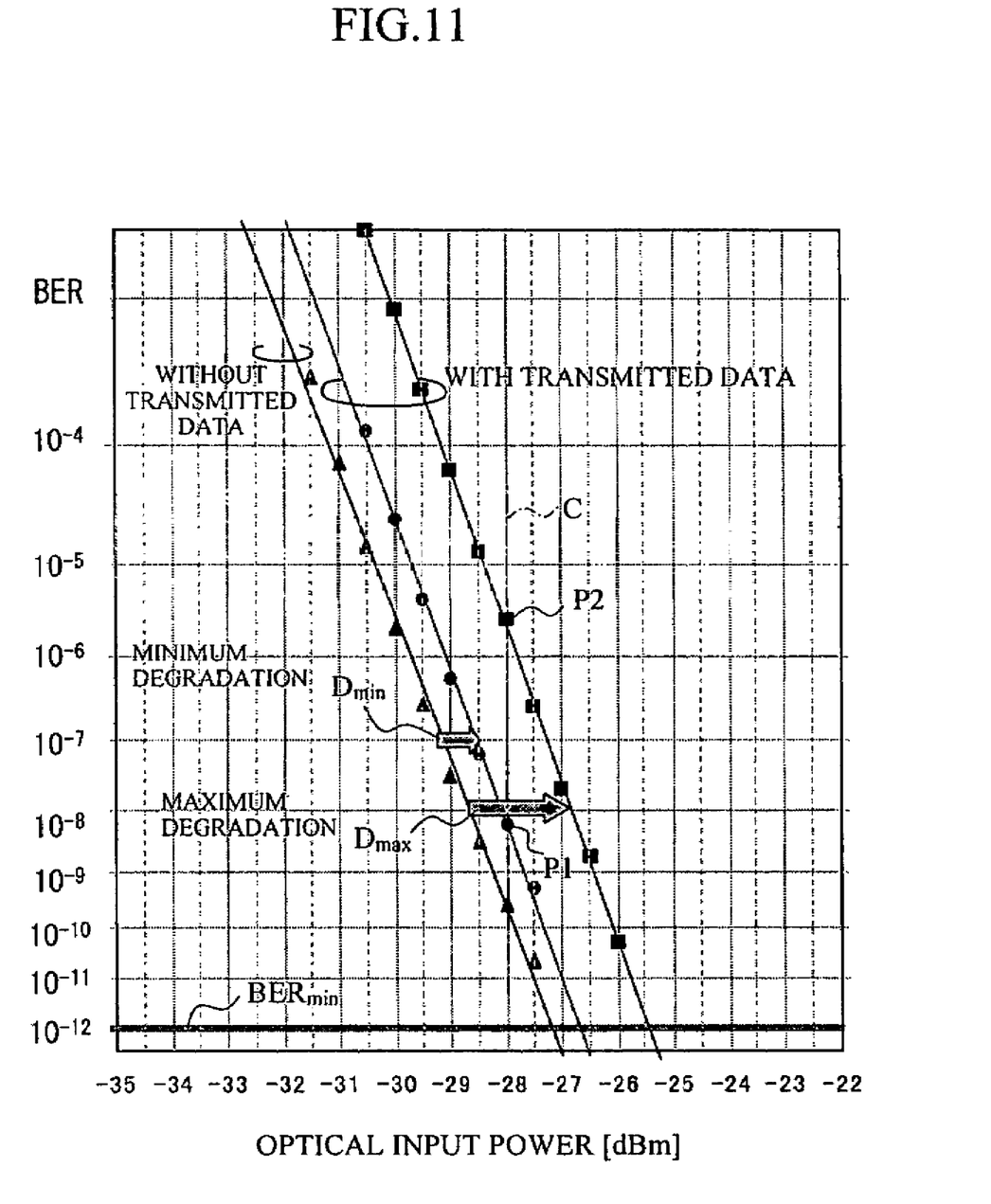
FIG. 11 is a graph showing a variation of a receiver sensitivity degradation due to a phase shift between a transmitter portion and a receiver portion.

However, in the synchronous system as shown in FIG. 10A, the receiver sensitivity degradation varies on a time basis as mentioned above. As shown in FIG. 11, a BER (Bit Error Rate) of the received data for an optical input power changes at random from the minimum receiver sensitivity degradation Dmin (characteristic shown by a mark ●) to the maximum receiver sensitivity degradation Dmax (characteristic shown by a mark ■) in the absence of the transmitted data TX (characteristic shown by a mark ▲), resulting in variation phenomenon of the BER on a time basis.

Therefore, at the time of designing the optical apparatus and testing the characteristic of the products, it is necessary to suppress the crosstalks between the transmitter portion and the receiver portion so that the criteria of the minimum input sensitivity may be satisfied even in the phase relationship of the transmitted data and the received data where the receiver sensitivity degradation becomes maximum.

SUMMARY OF THE INVENTION

It is accordingly an object of the present invention to provide an optical apparatus which suppresses crosstalks between the transmitter portion and the receiver portion even when the optical apparatus is connected to a synchronous system and which minimizes a receiver sensitivity degradation.

In order to achieve the above-mentioned object, an optical apparatus according to the present invention comprises: a phase comparator detecting a phase shift (or difference) between a changing point of data transmitted through an electro/opto converter and a changing point of data received through an opto/electro converter; and a controller controlling delay of the transmitted data so that the phase shift outputted by the phase comparator becomes equal to a value which minimizes a receiver sensitivity degradation due to crosstalks between a transmitter portion and a receiver portion, and outputting a difference between the phase shift outputted from the phase comparator and a value which minimizes the receiver sensitivity degradation, and a variable delay circuit controlling delay of the transmitted data by the difference.

Namely, as mentioned above, when the transmitted data is synchronized with the received data in the optical apparatus, a receiver sensitivity degradation depends on a phase relationship of changing points between the transmitted data and the received data, even when the crosstalks between the transmitter portion and the receiver portion is constant.

Therefore, the phase comparator detects a phase shift between a changing point of data transmitted toward an electro/opto converter and a changing point of data having received from an opto/electro converter, and controls delay of the transmitted data based on the phase shift.

In this case, the position where the phase shift between the transmitted data and the received data is detected is different from the position where the crosstalks occur as shown in FIG. 10A. Therefore, even if the phase shift between the transmitted data and the received data is made zero, the crosstalks are not necessarily minimized.

Therefore, the controller controls delay of the transmitted data so that the phase shift detected by the phase comparator becomes equal to a value which minimizes a receiver sensitivity degradation due to crosstalks between the transmitter portion and the receiver portion.

Thus, it becomes possible to keep the phase shift between the transmitted data and the received data by which the receiver sensitivity degradation is minimized, regardless of a phase change outside the optical apparatus such as a variation of a propagation time on a transmission line.

For the value which minimizes the above-mentioned receiver sensitivity degradation, a fixed value previously determined or a BER obtained from outside may be used.

Furthermore, the optical apparatus may further comprise a BER detector of the received data, and the controller may use the BER detected by the BER detector as the value which minimizes the receiver sensitivity degradation.

The above-mentioned controller outputs a difference between the phase shift outputted from the above-mentioned phase comparator and a value which minimizes the receiver sensitivity degradation, and a variable delay circuit controls delay of the transmitted data by the difference.

Also, one aspect of the above-mentioned transmitted data may comprise data having passed through CDR, and one aspect of the received data may comprise data not having passed through the CDR.

Furthermore, as another aspect, the above-mentioned transmitted data and received data may be for a synchronous system.

The present invention enables a temporal variation of the receiver sensitivity degradation due to crosstalks between the transmitter portion and the receiver portion to be reduced when the received data is synchronized with the transmitted data and the phase shift between the transmitted data and the received data varies. Also, by the present invention, the receiver sensitivity degradation can be constantly kept minimum. Therefore, allowable crosstalks are increased compared with the prior art, so that a circuit design and mounting design are facilitated upon an upgrade of a bit rate and downsizing the optical apparatus, thereby enabling a receiver portion with high sensitivity to be realized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiment [1]

FIGS. 1, 2A-2F, 3A, 3B, 4, and 5

Figure 1:
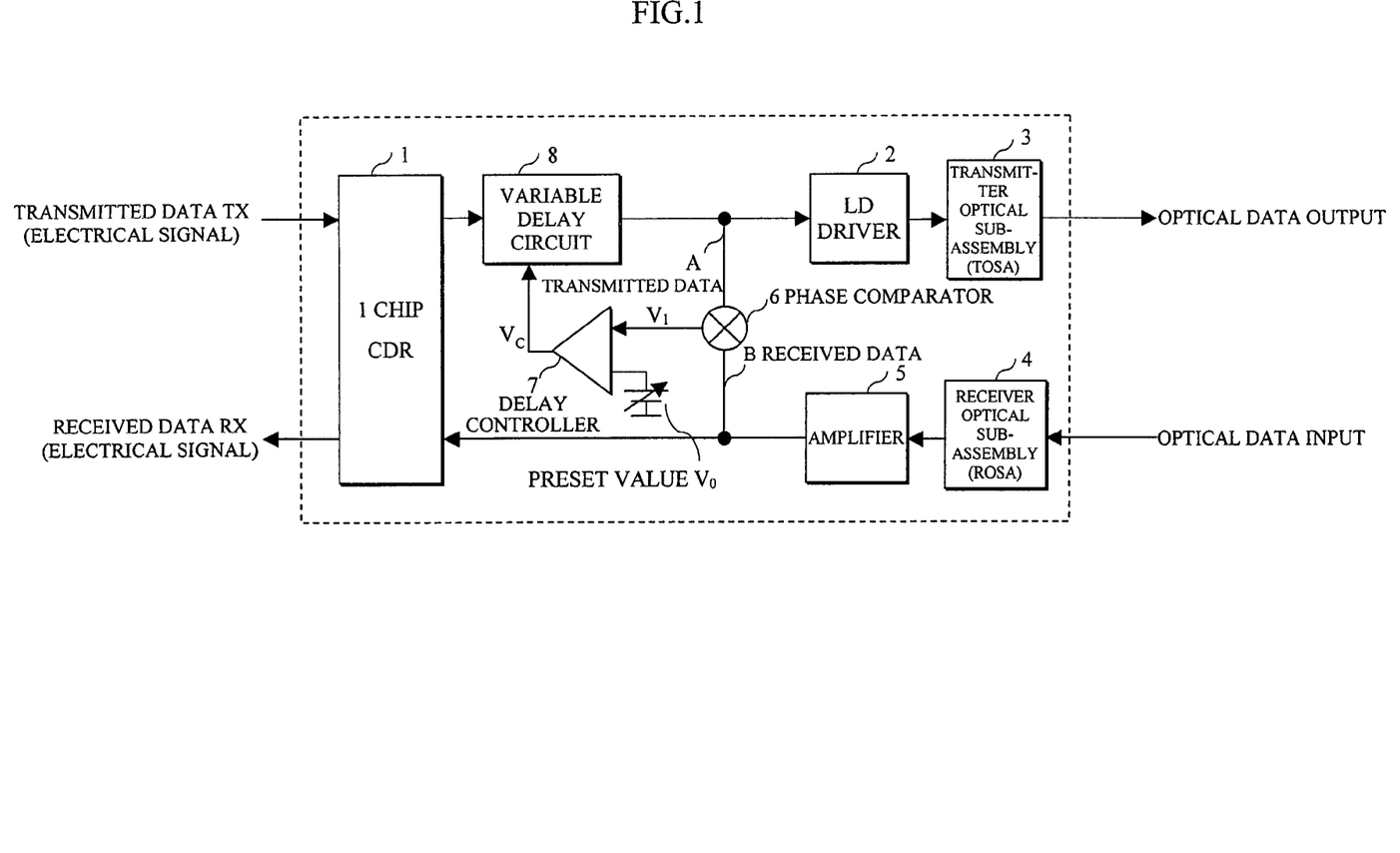
FIG. 1 is a block diagram showing an embodiment [1] of an optical apparatus according to the present invention.

FIG. 1 shows an embodiment [1] of an optical apparatus according to the present invention. This embodiment [1] is different from the general optical apparatus shown in FIG. 9 in that there are added a phase comparator 6 obtaining a phase shift between a transmitted data A inputted to an LD driver 2 and a received data B outputted from an amplifier 5, a delay controller 7 inputting an output $V_1$ of the phase comparator and a preset value $V_0$ to output the difference therebetween, and a variable delay circuit 8 variably delaying the transmitted data from a CDR 1 by an output $V_C$ of the delay controller 7.

In operation of this optical apparatus, when the transmitted data A and the received data B are provided to the phase comparator 6, the phase comparator 6 outputs a phase shift signal $V_1$ between both of the data.

Figure 2A:
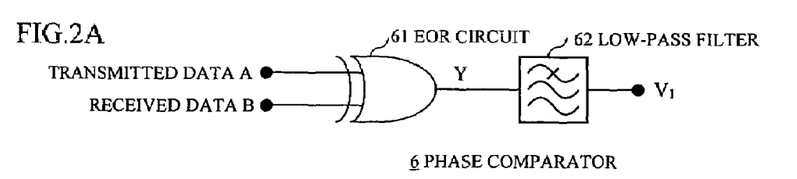
FIGS. 2A-2F are diagrams showing an embodiment of a phase comparator used for embodiments of the present invention.
Figure 2B:
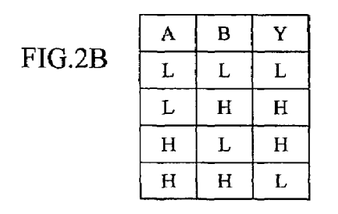

FIGS. 2A-2F show an embodiment of the phase comparator 6, which is composed of an EOR (Exclusive OR) circuit 61 inputting the transmitted data A and the received data B, and a low-pass filter 62 connected to the circuit 61 in series as shown in FIG. 2A. The EOR circuit 61 in the phase comparator 6 is for detecting a logical exclusive OR, i.e. inconsistency between the transmitted data A and the received data B as shown in FIG. 2B. Only when the transmitted data A and the received data B are inconsistent with each other, an output Y thereof becomes a "H" (high).

Figure 2C:
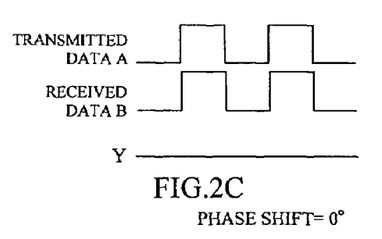
Figure 2D:
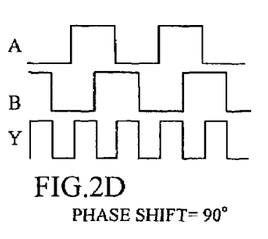
Figure 2E:
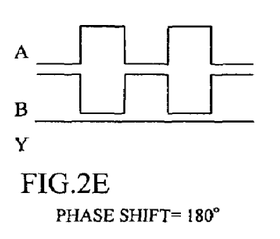

Namely, when the phase shift between the transmitted data A and the received data B is 0°, i.e. both data are in-phase as shown in FIG. 2C, the output Y assumes all "0". Also, as shown in FIG. 2D, when the transmitted data A is shifted from the received data B by 90°, the output Y provides a pulse waveform whose duty ratio is just 50%. Furthermore, as shown in FIG. 2E, when the transmitted data and the received data are in opposite phase, namely, have the phase shift of 180°, the output Y assumes all "H".

Figure 2F:
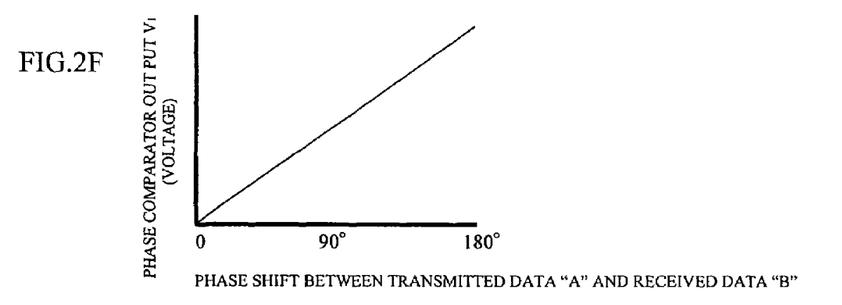

Accordingly, it is found that the output signal $V_1$ from the low-pass filter 62 which receives the output Y of the EOR circuit 61 indicates the characteristic of becoming larger in proportion to the phase shift between the transmitted data A and the received data B as shown in FIG. 2F.

The phase shift signal $V_1$ thus obtained from the phase comparator 6 is compared with the preset value $V_0$, so that the difference $V_C$ is obtained in the delay controller 7. It is to be noted that the preset value $V_0$ in this case is preset to a value which minimizes the BER of the received data.

For example, if an optical level signal of −28 dBm a little lower than the intersection point of the minimum BERmin ($10^{-12}$) with a characteristic without transmitted data (shown by a mark ▲) is provided to the receiver optical sub-assembly 4, and if a variable preset value $V_0$ is changed in the optical apparatus having the receiver sensitivity characteristic shown in FIG. 11, a phase shift occurs between the transmitted data A and the received data B by the influence of crosstalks. As a result, the receiver sensitivity BER fluctuates between a point P1 where a line C intersects with a characteristic shown by a mark ● and a point P2 where the line C intersects with a characteristic shown by a mark ■. Accordingly, the value of $V_0$ at the time when the receiver sensitivity BER indicates the point P1 (between $10^{-9}$ and $10^{-10}$) while changing the value may be determined as the preset value $V_0$.

Thus, the difference $V_C = V_1 - V_0$ is outputted from the delay controller 7 to be provided to the variable delay circuit 8, so that a delay control corresponding to the difference $V_C = V_1 - V_0$ is performed to the transmitted data from the CDR 1.

When the phase of the received data varies by the delay control and the difference arises from the preset value $V_0$, the delay of the variable delay circuit 8 is controlled according to the difference value and the change direction. Therefore, the optical apparatus is always kept at the preset phase shift $V_0$.

Figure 4:
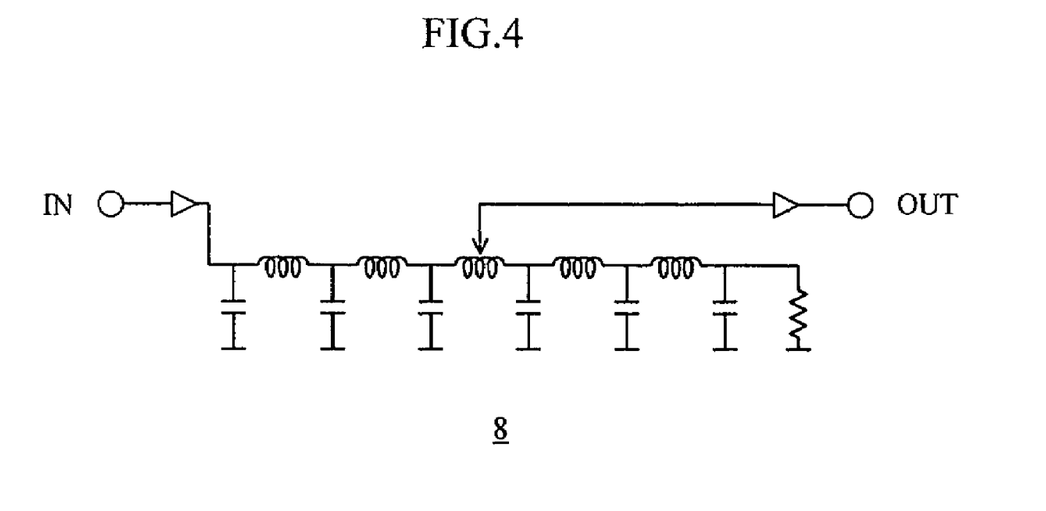
FIG. 4 is a diagram showing an embodiment of a variable delay circuit used for embodiments of the present invention.

FIG. 4 shows one embodiment of the variable delay circuit 8. As well known, the variable delay circuit 8 is provided with a plurality of stages of tank circuits composed of a capacitor and an inductance. The number of the stages is controlled by the difference $V_C$ from the delay controller 7, thereby varying the delay.

Figure 3A:
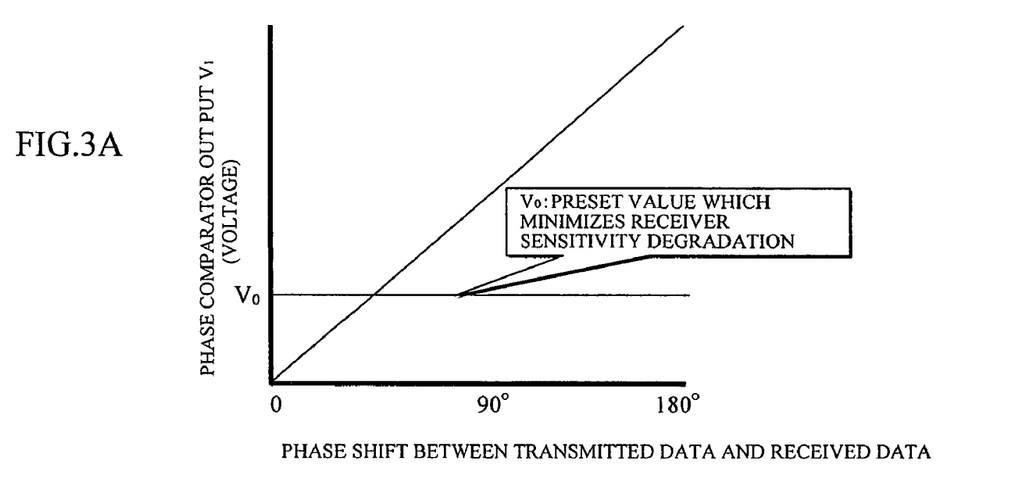
FIGS. 3A and 3B are graphs for illustrating a delay control operation of an embodiment [1] of an optical apparatus according to the present invention.
Figure 3B:
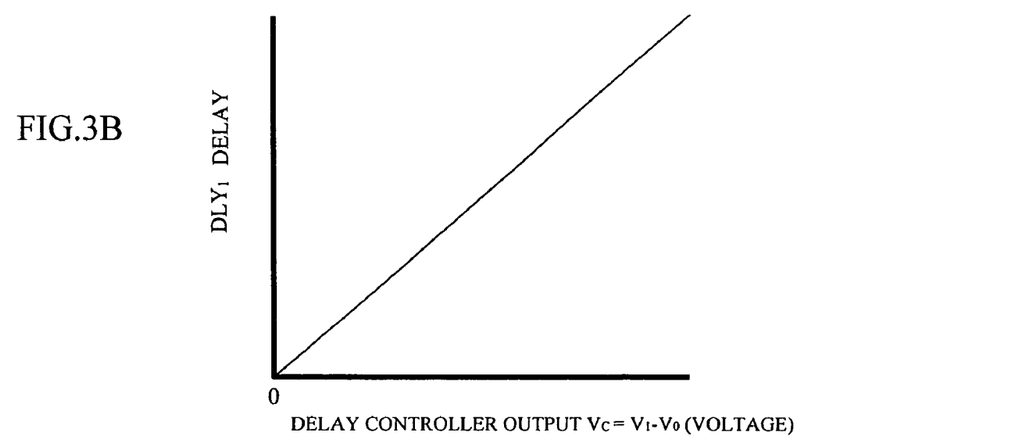

FIGS. 3A and 3B illustrate a delay control operation of the embodiment [1]. Namely, the characteristic shown in FIG. 3A corresponds to that of the phase comparator 6 shown in FIG. 2F, in which the output V1 (voltage) in proportion to the phase shift between the transmitted data and the received data is outputted. FIG. 3B shows a characteristic that the difference (output of the delay controller 7) $V_C$ between the output $V_1$ and the preset value $V_0$ which minimizes the receiver sensitivity degradation assumes a delay DLY1 which controls the variable delay circuit 8.

Namely, when the output $V_1$ of the phase comparator 6 coincides with the preset value $V_0$ which minimizes the receiver sensitivity degradation, the output $V_C$ of the delay controller 7 assumes zero where an offset may be provided. Accordingly, the delay $DLY_1$ of the variable delay circuit 8 also assumes zero. Thus, the delay $DLY_1$ is controlled according to the difference from the preset value $V_0$.

Figure 5:
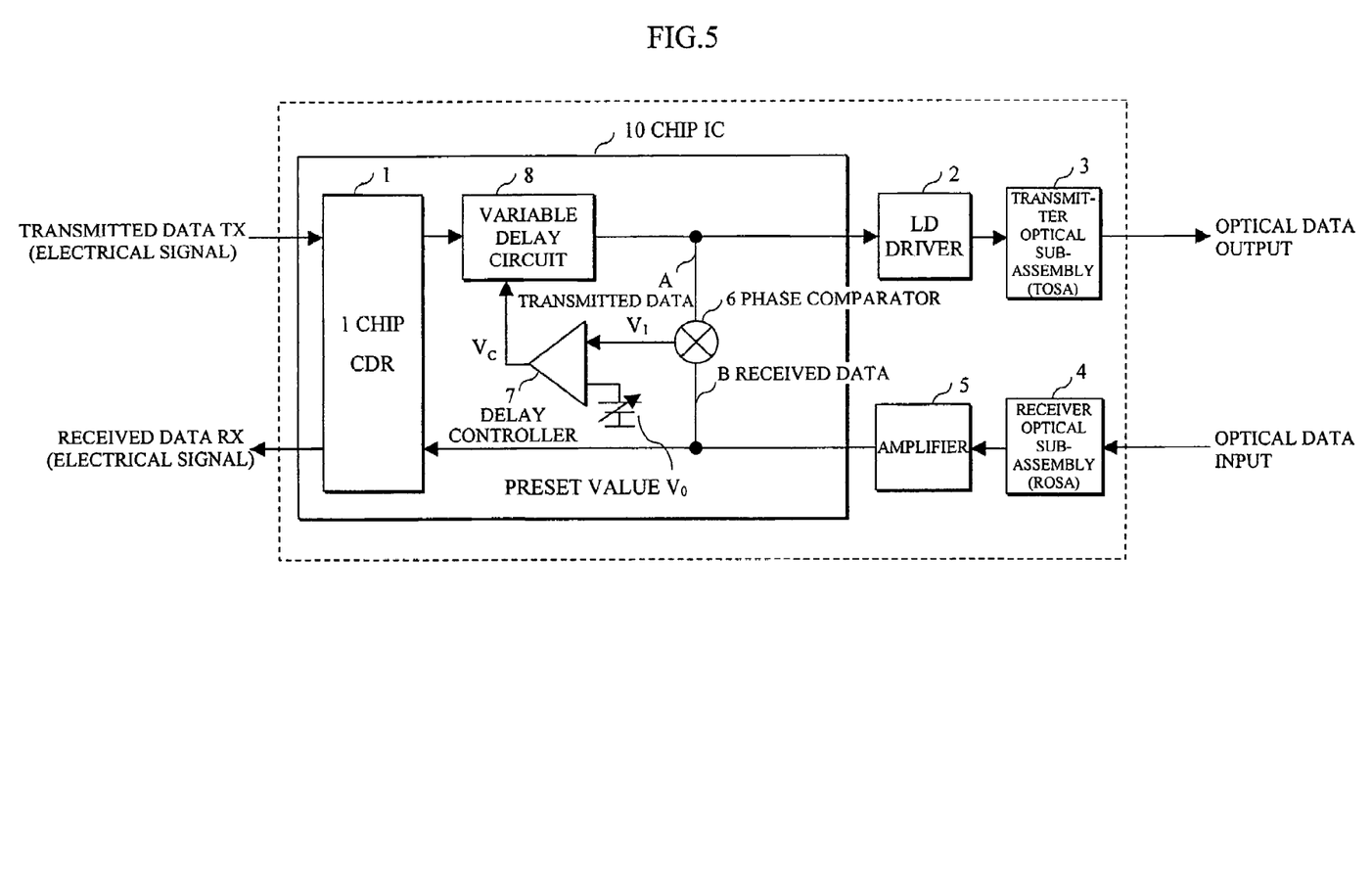
FIG. 5 is a block diagram showing a modification of an embodiment [1] of an optical apparatus according to the present invention.

FIG. 5 shows a modification of the embodiment [1]. In this modification, the combination of the phase comparator 6, the delay controller 7, and the variable delay circuit 8 shown in FIG. 1 are incorporated into the single chip IC 10 as well as the CDR 1. The operation thereof is the same as the case of FIG. 1.

Embodiment [2]

FIGS. 6, 7A, 7B, and 8

While in the above-mentioned embodiment [1], the preset value $V_0$ which minimizes the receiver sensitivity degradation shown in FIG. 3A is preset in the delay controller 7, in the embodiment [2] the BER of the received data obtained from the outside of the optical apparatus is substituted for the preset value $V_0$ in the above-mentioned embodiment [1].

Figure 7A:
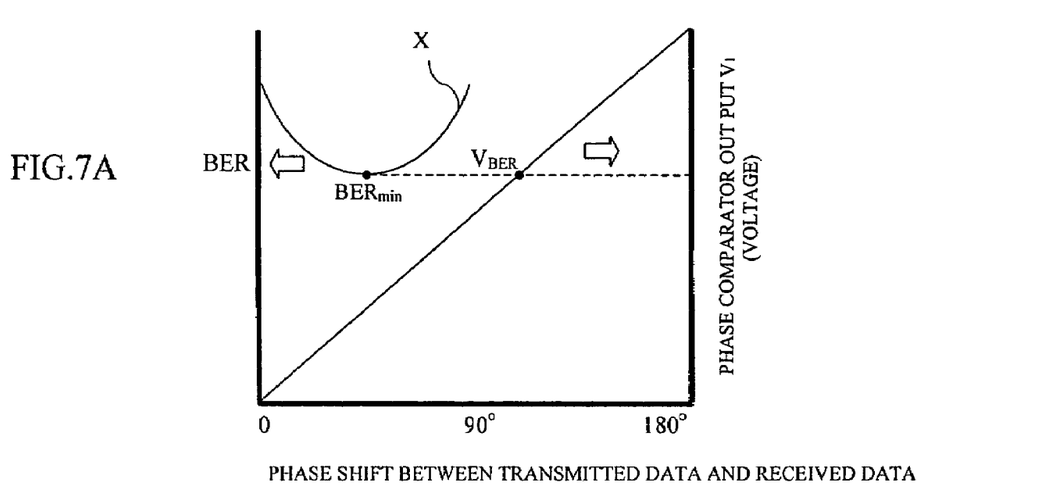
FIGS. 7A and 7B are graphs for illustrating a delay control operation of an embodiment [2] of an optical apparatus according to the present invention.
Figure 7B:
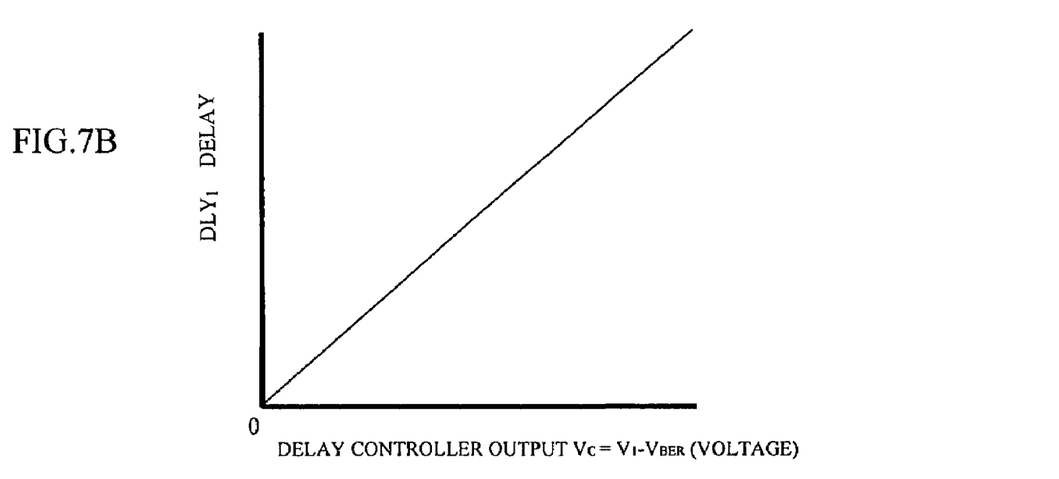

FIGS. 7A and 7B show graphs illustrating the operation in this case.

Namely, with respect to the characteristic of the phase comparator 6 as shown in FIG. 7A, the characteristic of the BER obtained from the outside assumes a characteristic curve X as shown in FIG. 7A. The point where the minimum value $BER_{min}$ of the BER in this case corresponds to the output $V_1$ of the phase comparator 6 is $V_{BER}$. At this time, the output $V_C$ of the delay controller 7 assumes $V1-V_{BER}$. When both are equal with each other, the delay DLY1 assumes 0. If not the case where an offset may be provided, the delay $DLY_1$ is controlled so that the BER may become the minimum. In this case, the control direction is determined by the variation direction of the phase shift.

Figure 6:
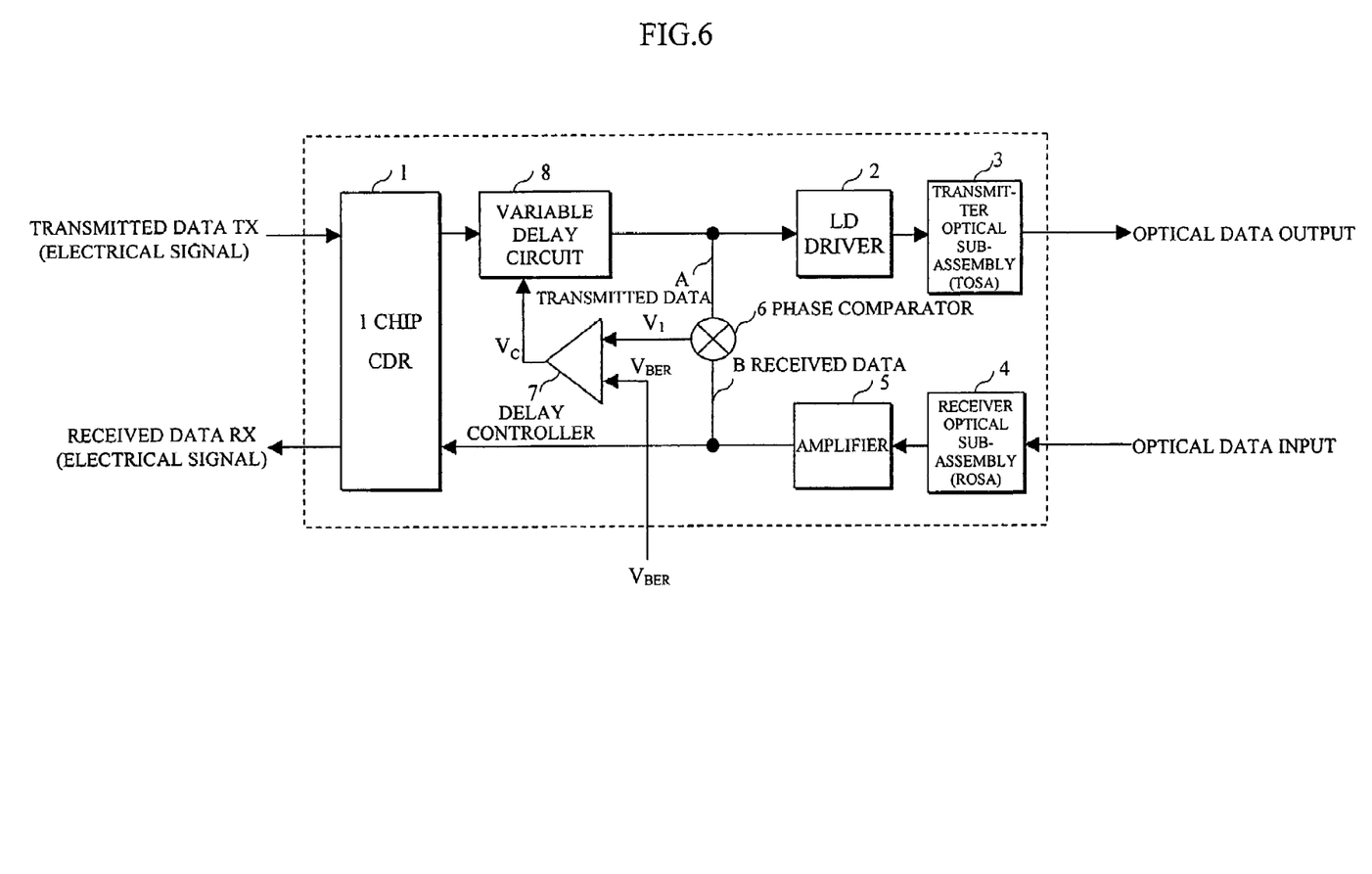
FIG. 6 is a block diagram showing an embodiment [2] of an optical apparatus according to the present invention.
Figure 8:
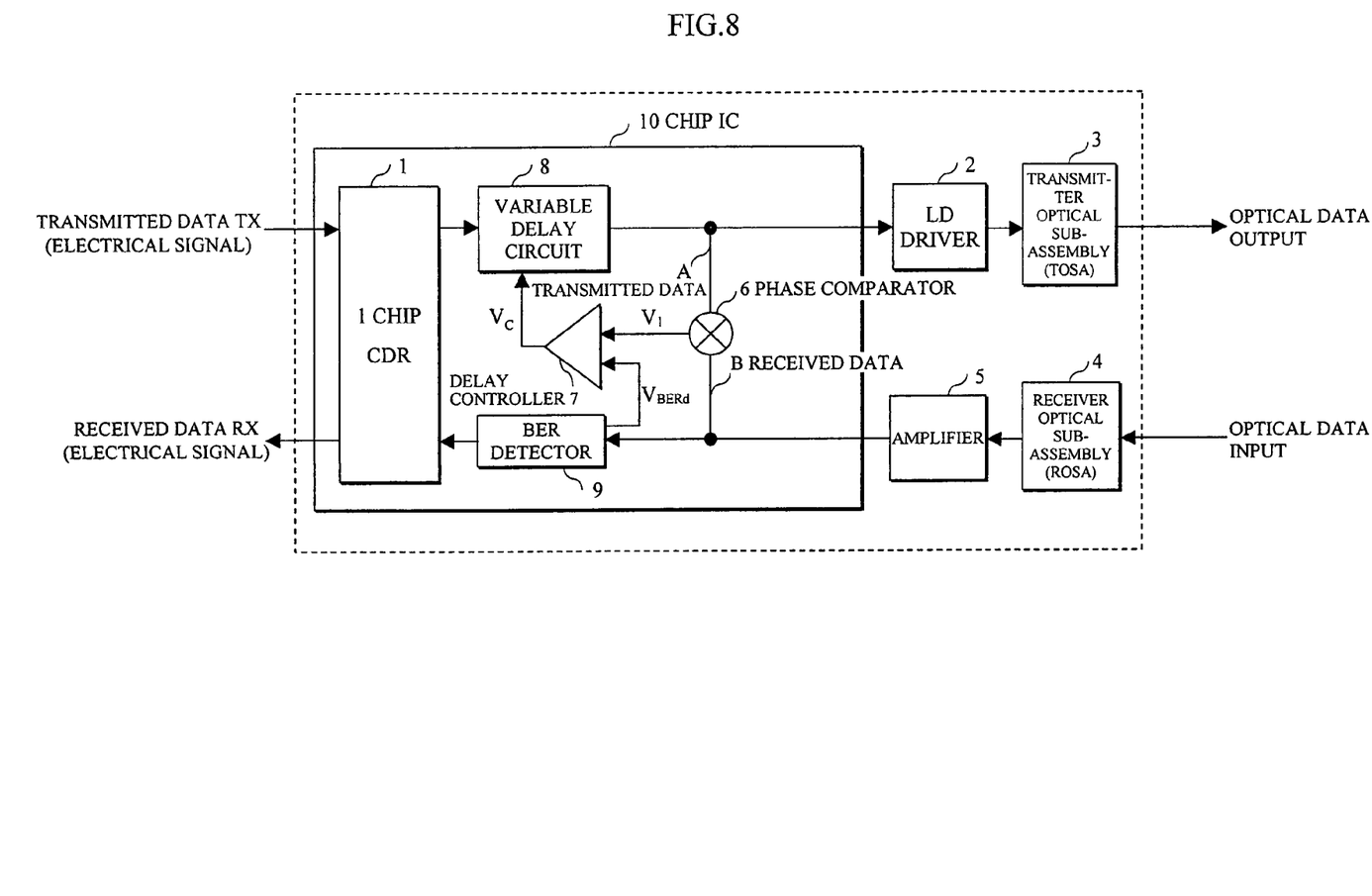
FIG. 8 is a block diagram showing a modification of an embodiment [2] of an optical apparatus according to the present invention.

FIG. 8 shows a modification of the embodiment [2] shown in FIG. 6. While in the embodiment [2] of FIG. 6 the BER is obtained from the outside, in this modification a BER detector 9 is provided within the single chip IC 10, the BER of the received data outputted from the amplifier 5 is detected, the BER is provided to one input of the delay controller 7 as $V_{BERd}$ instead of the above-mentioned preset value $V_0$ or $V_{BER}$. Accordingly, the operation is basically the same as that of the embodiment [2] of FIG. 6.

It is to be noted that the present invention is not limited by the above-mentioned embodiments, and it is obvious that various modifications may be made by one skilled in the art based on the recitation of the claims.

What is claimed is:

1. An optical apparatus comprising:
   a phase comparator detecting a phase shift between a changing point of data transmitted through an electro/opto converter and a changing point of data received through an opto/electro converter; and
   a controller controlling delay of the transmitted data so that the phase shift outputted by the phase comparator becomes equal to a value which minimizes a receiver sensitivity degradation due to crosstalks between a transmitter portion and a receiver portion, and outputting a difference between the phase shift outputted from the phase comparator and a value which minimizes the receiver sensitivity degradation, and a variable delay circuit controlling delay of the transmitted data by the difference.

2. The optical apparatus as claimed in claim 1, wherein the controller uses a fixed value predetermined as the value which minimizes the receiver sensitivity degradation.

3. The optical apparatus as claimed in claim 1, wherein the controller uses a BER obtained from outside as the value which minimizes the receiver sensitivity degradation.

4. The optical apparatus as claimed in claim 1, further comprising a BER detector of the received data;
the controller using the BER detected by the BER detector as the value which minimizes the receiver sensitivity degradation.

5. The optical apparatus as claimed in claim 1, wherein the transmitted data comprises data having passed through CDR, and the received data comprises data not having passed through the CDR.

6. The optical apparatus as claimed in claim 1, wherein the transmitted data and the received data is for a synchronous system.

* * * * *